RANDOM ACCESS DATA STORAGE ACCESS MECHANISM

Filed Dec. 20, 1960

*INVENTOR.*
GORDON H. MAY

*BY* Robert B. Crouch

ATTORNEY 3,105,680

RANDOM ACCESS DATA STORAGE ACCESS MECHANISM

Gordon H. May, San Jose, Calif., assignor to International Business Machines Corporation, New York, N.Y., a corporation of New York Filed Dec. 20, 1960, Ser. No. 77,165
5 Claims. (Cl. 271—3)

This invention relates to a random access data storage apparatus in which data is stored on a plurality of comparatively short, compliant record strips and more particularly to an access mechanism for selectively presenting the strips to a read/write transducer in a cyclic manner.

A random access data storage mechanism of the type to which the present invention relates, is disclosed in the co-pending application of Lin et al., assigned to the above assignee, Serial No. 792,168, filed February 2, 1959, and entitled Data Storage Apparatus. A data storage device of this type comprises in general, a relatively large number of compliant record strips arranged in a plurality of bins; a read/write station which includes a rotatable drum, a read/write transducer, and a strip pickup head carried with the drum and operable to select a strip from a bin, wrap it on the drum and return it to its original position in the bin; suitable means for relatively positioning the strip pickup head adjacent the selected strip; and means for rotating the drum in response to control signals to cause operation of the strip pickup head.

The present invention provides a means for doubling the storage capacity of a random access data storage apparatus wherein information is recorded on compliant record strips. This result is obtained by provision of an access mechanism for such apparatus which permits data to be processed on both sides of each record strip with a single drum and a single pickup head. The access mechanism of the present invention includes an arm pivoted to a drum at one end and to a strip pickup head at the other end. The drum is mounted for rotation in two directions (clockwise and counterclockwise) past a read/write transducer. The pickup head rides in a Y-shaped guide slot which permits a record strip to be wound on the drum in either direction of its movement and allows each side of the strip to be presented to the transducer for processing of data.

The object of the present invention is to provide an access mechanism for a random access data storage apparatus which permits processing of data on either side of a compliant strip.

The foregoing and other objects, features and advantages of the invention will be apparent from the following more particular description of preferred embodiments of the invention, as illustrated in the accompanying drawings.

Figure 1:
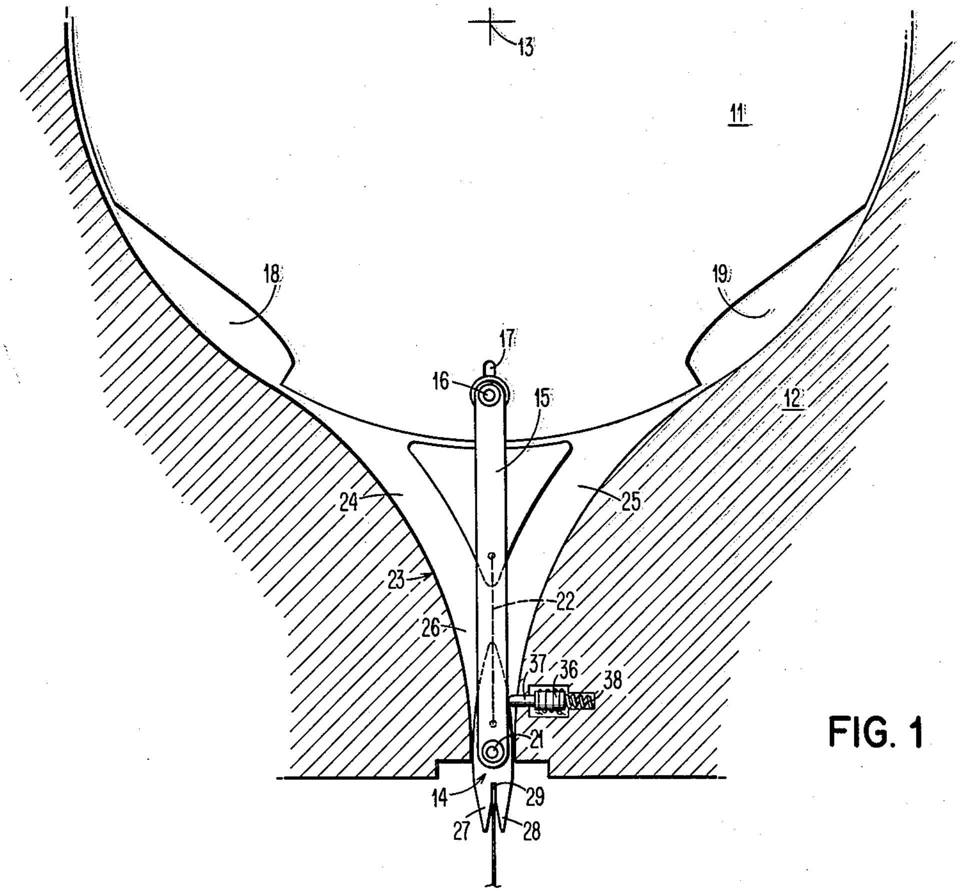
Figure 2:
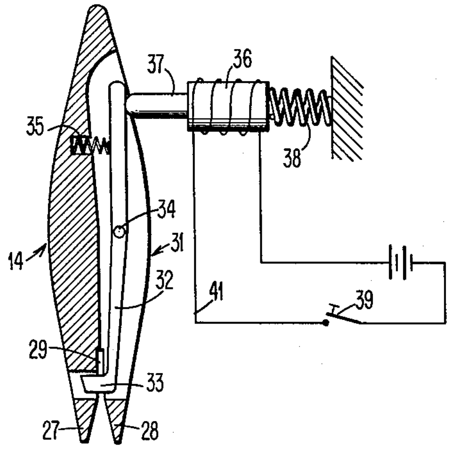

FIG. 1 is an elevation view partly in section of an access mechanism of the present invention; and FIG. 2 is a detailed view at an enlarged scale of the pickup head of FIG. 1.

Referring more particularly to FIG. 1 of the drawing, a drum 11 is illustrated as mounted within a housing 12, a portion of which is shown in section. The drum is mounted on a horizontal pivot 13 for rotational movement within the housing in either a clockwise or counterclockwise direction. A strip pickup head 14 is connected to the drum by an arm 15. The arm 15 is pivotally connected to the drum as by a pin 16 received within a slot 17 for adjustment of the position of the pickup head relative to the drum. The peripheral surface of the drum is recessed at 18 and 19 on opposite sides of the slot 17 to receive the pickup head during rotational movement of the drum. The pickup head 14 is pivotally secured to the free end of the arm 15 as by a pin 21 and a leaf spring 22 is secured at its opposite extremities to the arm and to the pickup head. A Y-shaped guide slot 23 having divergent arms 24, 25 and a common leg 26 is provided in the housing to receive the pickup head. The pickup head includes jaws 27 and 28 between which is a slot 29 adapted to receive a compliant strip of recording material.

Referring to FIG. 2, the details of the pickup head are illustrated as including a catch lever 31 for engaging the compliant strip to the head. As shown, the catch lever includes an elongated arm 32 ending in a finger 33 which is adapted to be received in a slot in the upper edge of the record strip. The arm 32 is mounted within the head for pivotal movement about pin 34 and is biased in a clockwise direction by a compression spring 35. An electrical solenoid 36 is mounted in the housing with its armature 37 protruding into the common leg 26 of the guide slot. The armature is biased by a compression spring 38 to its extended position wherein it bears against catch lever 31.

In a machine of the type to which the present invention relates, a compliant record strip is removed from a bin, wrapped around a drum and rotated past a transducer. The present invention allows the strip to be wound on the same drum in either direction by the same pickup head, thus allowing data to be recorded on both sides of the strip. Referring to FIG. 1, assuming the pickup head 14 is stored in recess 18, as the drum 12 is rotated in a clockwise direction the pickup head enters the right hand divergent arm 25 of the guide slot. It then engages a record strip in slot 29 at its lowermost position and emerges with the strip through the left hand divergent arm 24 of the guide slot. The record strip is withdrawn from the bin, wrapped around the drum and one side is processed, whereupon the direction of rotation of the drum is reversed. As the drum rotates in a counterclockwise direction, the strip re-enters the divergent arm 24 of the guide slot, followed by the pickup head. The pickup head keeps the strip engaged while it is in the common leg of the guide slot and emerges with the strip through the divergent arm 25 of the guide slot. The strip is now wrapped around the drum with its opposite side outward facing the transducer. After that side of the strip is processed, the direction of rotation of the drum is again reversed. The drum then rotates in a clockwise direction and the strip re-enters the divergent arm 25 of the guide slot, followed by the pickup head. At the position illustrated in FIG. 1, the strip has been returned to the bin and is ready to be released from the pickup head. Further rotation of the processing drum retracts the pickup head into the common leg of the guide slot and allows relative movement between the housing and the bin assembly to permit selection of another record strip to be processed.

The drum of the present invention is driven by any suitable means, such as a servo motor (not shown). Since no positive stops are required in the present mechanism the drum can be stopped or reversed as desired merely by control of the servo motor. The guide slot can be cast or otherwise formed in the housing or can be fabricated from sheet metal and mounted adjacent the drum. The guide slot is positioned such that the divergent arms are each approximately tangential to the periphery of the drum and the common leg lies on an extension of a radius of the drum.

The means for engagement or disengagement of the strip is independent of the direction of rotation of the drum, since engagement, disengagement or retention of the record strip may be required during travel of the pickup head over a given path. These different conditions are met by provision of the electrical solenoid device of FIG. 2. The solenoid is programmed externally as by switch 39 to supply current selectively through lead 41 according to the required conditions of strip engagement or disengagement. The armature 37 of the solenoid is normally extended by the compression spring 38 such that upon entrance of the pickup head into the common leg of the guide slot, the armature bears against the catch lever 31. The pressure of the armature is sufficient to rotate the catch lever against the action of compression spring 35, thus withdrawing fingers 33 from the slot in the compliant record strip and allowing the pickup head to be disengaged from the record strip. Whenever the head is required to pick up or retain a strip, the solenoid is actuated to retract the armature against the compression spring 38. This allows spring 35 to rotate catch lever 31 in a clockwise direction and engage fingers 33 in the slots in the upper edge of the strip.

As the strip is withdrawn from the bin and wound upon the drum, the pickup head is stored in one of the recesses 18 or 19, depending upon the direction of rotation of the drum. The leaf spring 22 is secured to both the arm and the pickup head to align the pickup head with the arm. As the head rises within the common leg of the guide slot, flexure of the spring directs the head toward the correct divergent arm of the guide slot.

While the present invention is particularly applicable to a random access storage device which utilizes magnetic recording upon strips of tape, it is not limited to this application. The present device is equally applicable to any random access storage apparatus which utilizes compliant strips upon which the data is stored by any means, for instance, photographically, etc.

While the invention has been particularly shown and described with reference to preferred embodiments thereof, it will be understood by those skilled in the art that various changes in the form and details may be made therein without departing from the spirit and scope of the invention.

What I claim is:

1. An access mechanism for a random access data storage apparatus, comprising: a housing; a drum having a pair of spaced recesses in its periphery, the drum being journaled within the housing for both clockwise and counterclockwise rotation; a Y-shaped guide slot within the housing having divergent arms approximately tangential to the periphery of the drum; a strip pickup head slidably mounted in the guide slot; and an arm pivotally connected at its opposite ends to the drum and to the pickup head for withdrawing the head from the guide slot and lodging it in one of the recesses upon rotation of the drum.

2. An access mechanism for a random access data storage apparatus, comprising: a housing; a drum having a pair of spaced recesses in its periphery, the drum being journaled within the housing for unrestrained rotation in both clockwise and counterclockwise directions; a Y-shaped guide slot within the housing having divergent arms approximately tangential to the periphery of the drum and a common leg radial of the drum; a strip pickup head slidably mounted in the guide slot; and an arm pivotally connected at its opposite extremities to the drum and the pickup head for withdrawing the head from the guide slot and lodging it in one of the recesses upon rotation of the drum.

3. An access mechanism for processing data on both surfaces of a strip of compliant tape, comprising: a housing; a drum journaled in the housing for both clockwise and counterclockwise rotation; a Y-shaped guide slot within the housing having divergent arms approximately tangential to the periphery of the drum and common leg radial of the drum, the common leg being open at one end to a supply of compliant strips; a strip pickup head positioned in the guide slot, the head having a slot in its lower extremity adapted to engage an edge of a compliant strip; an arm pivotally connecting the pickup head to the drum; and means carried by the arm for urging the pickup held into the proper divergent arm of the guide slot for either direction of rotation of the drum.

4. An access mechanism as defined in claim 3 including selectively operable means mounted adjacent the common leg of the guide slot for releasing the strip from the pickup head.

5. An access mechanism as defined by claim 3 including a catch lever pivotally mounted in the pickup head, the catch lever having a finger at one end extending normal to the slot and adapted to cooperate with the slot for engaging a compliant strip.

References Cited in the file of this patent

UNITED STATES PATENTS

| | | |
|---|---|---|
| 2,957,690 | Thompson | Oct. 25, 1960 |
| 2,969,981 | Faeber | Jan. 31, 1961 |